൴ - HYDROXY - 3 - FURYLCARBAMYL - 2H - 1,2-
BENZOTHIAZINE 1,1-DIOXIDES AND PROCESS
THEREOF

Harold Zinnes, Rockaway, Neil A. Lindo, Chatham, and
John Shavel, Jr., Mendham, N.J., assignors to Warner-
Lambert Pharmaceutical Company, Morris Plains,
N.J.
No Drawing. Filed July 16, 1970, Ser. No. 55,559
Int. Cl. C07d 93/02
U.S. Cl. 260—243 R                         3 Claims

ABSTRACT OF THE DISCLOSURE

A 3-substituted benzothiazine having the structural formula

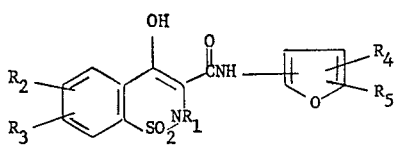

is disclosed, wherein $R_1$ is alkyl, aralkyl, cyanomethyl, carboalkoxymethyl, and the like. $R_2$, $R_3$, $R_4$ and $R_5$ are hydrogen, alkyl, halogen, nitro, cyano, carboalkoxy, trifluoromethyl and the like. These compounds are prepared by treating the corresponding 2-$R_1$-2H-1,2-benzothiazine-4(3H)-one 1,1-dioxide with the appropriate $R_4$–$R_5$-substituted furylisocyanate in the presence of a strong base. The compounds of this invention are useful as anti-inflammatory, antipyretic and analgesic agents.

---

The present invention relates to certain 3-furyl substituted 1,2-benzothiazines having the following structural formula:

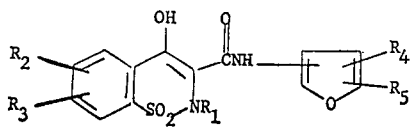

wherein $R_1$ is alkyl, aralkyl, cyanomethyl, carboalkoxymethyl, and the like. $R_2$, $R_3$, $R_4$ and $R_5$ are hydrogen, alkyl, halogen, nitro, acylamino, amino, monoalkylamino, dialkylamino, alkoxy, carboalkoxy, cyano, trifluoromethyl, methylenedioxy, and the like.

In the above definitions for $R_1$, $R_2$, $R_3$, $R_4$ and $R_5$, the term "alkyl" embraces both straight and branched chain alkyl radicals containing 1 to 8 carbon atoms, e.g., methyl, ethyl, propyl, isopropyl, n-butyl, n-amyl, n-hexyl, 2-ethylbutyl, 2,3-dimethylbutyl, and the like. The term "halogen" includes all four halogens, i.e., fluorine, chlorine, bromine and iodine. The term "aryl" denotes a monocyclic aromatic hydrocarbon radical, preferably of 6 to 10 carbon atoms such as phenyl, tolyl, and the like. The term "aralkyl" encompasses alkyl groups in which aryl, as defined above, is substituted for a hydrogen atom, e.g., benzyl, phenethyl, and the like, and also includes such groups in which one or more of the hydrogen atoms of the aryl portion have been substituted. The term "alkoxy" as used herein also contains from 1 to 8 carbon atoms such as methoxy, ethoxy, n-propoxy, isopropoxy, and the like.

The compounds of this invention are useful as antiinflammatory agents, antipyretics and analgesics. For example, they are able to uncouple oxidative phosphorylation, a property which is common to most anti-inflammatory agents, e.g., aspirin, phenylbutazone, and the like. When administered orally or parenterally to mammals, such as rats, in doses of 10 to 250 mg./kg., they reduce the swelling of the rat paw induced by injection into the foot pads of these rats by an irritant such as carrageenin. At an oral dose of 10 to 250 mg./kg., the compounds of this invention have also been observed to inhibit yeast-induced hyperthermia in the rat. Oral doses of 25 to 100 mg./kg. also produce an analgesic effect as determined by the phenylquinone writhing syndrome test in experimental animals such as mice. These methods for the determination of anti-inflammatory activity, antipyretic activity and analgesic activity are well known in the art.

Accordingly, the compounds of this invention are indicated in conditions such as arthritis in a mammal such as cats, dogs, monkeys, and the like. A dosage regimen of 10 to 250 mg./kg. orally or by injection several times a day is recommended. This dosage regimen can be varied in accordance with age, weight and severity of the condition being treated.

In order to use these compounds, they are formulated in dosage forms commonly used in oral or parenteral administration. These include, e.g., tablets, capsules, suspensions, solutions for injection, and the like. These formulations are prepared by mixing the active ingredient with pharmaceutical excipients such as lactose, dicalcium phosphate and sterile water and compounded by methods well known to the pharmacist's art to give final forms containing 10 to 250 mg. per dosage unit.

According to the present invention, the compounds of this invention are prepared by treating a compound of the formula:

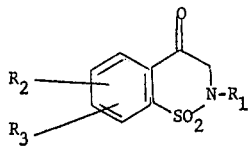

with a base or a Grignard reagent to convert it to its corresponding anion. The resulting anion is then reacted with an $R_4$–$R_5$-substituted furyl isocyanate in an inert solvent.

Among the bases which can be used for the conversion of the starting material to its anion are, for example, the alkali metal hydride, for example, sodium hydride or an organic base such as triethylamine, and the like. The Grignard reagent employed is typically a lower alkyl magnesium halide, e.g., isopropyl magnesium halide, and the like. Among the solvents useful for the reaction are, e.g., tetrahydrofuran, ether, dimethylformamide, and the like.

The starting benzothiazines for the preparation of the compounds of this invention are prepared according to the teachings of Zinnes et al., Journal of Organic Chemistry 31, 162 (1966).

The following example is included in order to further illustrate the practice of this invention:

EXAMPLE

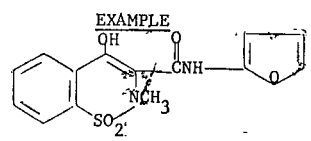

4 - hydroxy - 2 - methyl-3-(2-furylcarbamyl)-2H-1,2-benzothiazine 1,1-dioxide.—A solution of 9.5 g. (0.045 mole) of 2 - methyl-2H-1,2-benzothiazin-4(3H)-one 1,1-dioxide in 70 ml. of tetrahydrofuran was added dropwise with a stirring over a period of 45 minutes to a slurry of 0.056 mole of sodium hydride in 20 ml. of tetrahydrofuran, the temperature being maintained at 0° to −5° C. When gas evolution had ceased, a solution of 6.1 g. (0.056 mole) of 2-furylisocyanate in 50 ml. of tetrahydrofuran was added at such a rate that the temperature remained at −5° C. It was then allowed to stir at room temperature for 3 hours, and the solvent was removed in vacuo at room temperature. The residue was poured into ice-water and the resulting mixture filtered. The aqueous filtrate was acidified with dilute hydrochloric acid and the resulting precipitate was dissolved in dichloromethane. The residue obtained on evaporation of the dried dichloromethane solution was triturated with 50 ml. of methanol to give 10.3 g. of crystalline material, M.P. 197° dec. Recrystallization from methyl ethyl ketone gave 5 g. of product, M.P. 208–209° dec.

*Analysis.*—Calcd. for $C_{14}H_{12}N_2O_5S$ (percent): C, 52.50; H, 3.78; N, 8.75; S, 10.01. Found (percent): C, 52.63; H, 3.78; N, 8.58; S, 9.94.

We claim:
1. A compound formula:

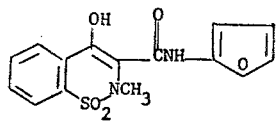

2. A process for the production of a compound according to claim 1 which comprises treating:
   (a) 2 - methyl-2H-1,2-benzothiazin-4(3H)-one 1,1-dioxide with a base, and
   (b) treating the product obtained in (a) with 2-furyl isocyanate.

3. A process for the production of a compound according to claim 1 which comprises treating:
   (a) 2-methyl-2H-1,2-benzothiazin-4(3H)-one 1,1 - dioxide with an alkyl magnesium halide, and
   (b) treating the product obtained from (a) with a 2-furyl isocyanate.

References Cited
UNITED STATES PATENTS
3,501,466  3/1970  Rasmussen _____ 260—243

JOHN M. FORD, Primary Examiner

U.S. Cl. X.R.
424—246